May 9, 1939.     F. H. McCORMICK     2,157,910
LIQUID HEATER
Filed Nov. 26, 1937
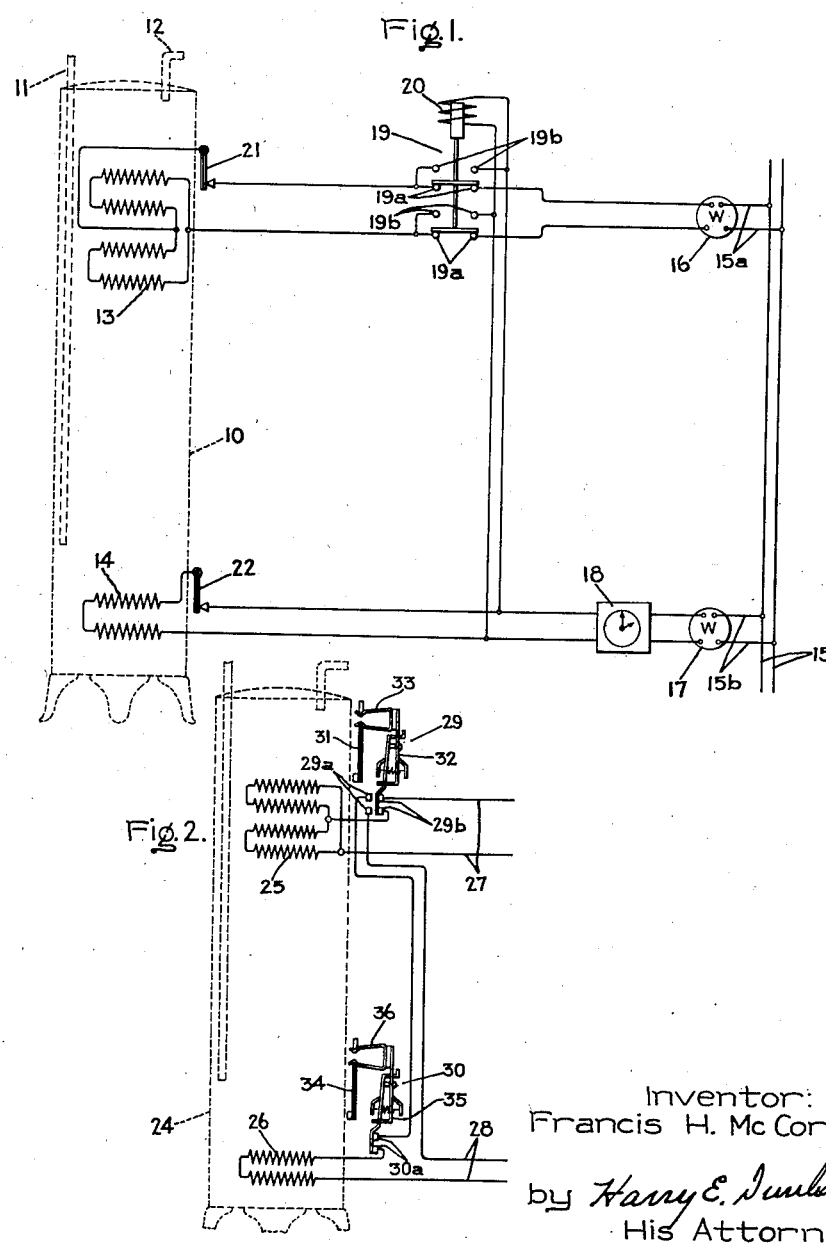
Inventor:
Francis H. McCormick,
by Harry E. Dunham
His Attorney.

Patented May 9, 1939

2,157,910

UNITED STATES PATENT OFFICE 2,157,910

LIQUID HEATER

Francis H. McCormick, Dayton, Ohio, assignor to Edison General Electric Appliance Company, Inc., a corporation of New York Application November 26, 1937, Serial No. 176,476

6 Claims. (Cl. 219—39)

This invention relates to liquid heaters, more particularly to electrical water heaters, and it has for its object the provision of an improved heater of this character.

More particularly, this invention relates to electric water heaters having two heating elements, one arranged to apply heat to the water in the upper portion of a storage tank and the other to apply heat to the water in the lower portion of the storage tank. In heaters of this character, it is contemplated that the lower heating element will be used in the main to heat the contents of the tank and to maintain a supply of hot water, and that the upper, which preferably will be of a relatively large heat generating capacity, will be used only to recuperate a supply of hot water in the event the hot water draw-offs have exceeded the capacity of the lower heating element. Usually in such systems, the lower heating element is electrically supplied from a low rate metered source, or an unmetered source of electrical supply, while the upper heating element is connected with a high rate metered source, such as the ordinary general purpose metered circuit. Furthermore, a time switch is usually added to connect and disconnect the lower heating element from the low rate metered or unmetered source so that this element can be energized only during the off-peak hours of the electrical supply system.

This water heater is somewhat objectionable because it is found that a portion of the electrical energy used by the relatively large capacity heat generating element at the top during the off-peak hours due to a depletion of the hot water supply beyond the capacity of the lower heating element is charged at the high rate meter.

This invention contemplates an improved electrical heater of this character wherein all of the electrical energy that is used during the off-peak periods, whether it be used by the lower heating element or by the upper heating element, is charged only at the off-peak rate.

In accordance with this invention in one form thereof, a suitable switching means is provided for connecting the upper heating element either to the high rate metered source or to the low rate metered source, and this switching means is operated responsively to the operation of the time switch which functions to connect and disconnect the lower heating element to and from the low rate metered source so that when this time switch connects the lower heating element to this source, the switching means is automatically operated to disconnect the upper heating element from the high rate metered source and to connect it to the low rate metered source. When the time switch operates to disconnect the lower heating element from the low rate metered source at the beginning of the on-peak period, it automatically operates the switching means to transfer the upper heating element back to the high rate metered source.

For a more complete understanding of this invention, reference should be had to the accompanying drawing in which Fig. 1 is a diagrammatic representation of an electric water heater embodying this invention, and Fig. 2 is a view similar to Fig. 1, but illustrating a modified form of this invention.

Referring to the drawing, this invention in one form comprises a suitable metallic water storage tank 10 having a cold water intake pipe 11 and a hot water draw off pipe 12. A pair of heating elements 13 and 14 are provided for applying heat to the water in the upper and lower portions of the tank respectively. Preferably, the upper heating element 13 will have a considerably larger capacity than the lower heating element 14. For example, the lower heating element may have a capacity of 1000 watts, whereas the upper heating element may have a capacity of 2500 watts. Preferably immersion heaters of the sheathed type will be used, such as described in the United States Patent to C. C. Abbott, No. 1,367,341, dated February 1, 1921, although it is to be understood that this invention is not limited to heaters of this character.

Two heating elements 13 and 14 are electrically energized from a source of supply 15 which is divided into two sub-sources 15a and 15b. The source of supply 15a is the on-peak source and is the high metered rate, while the other source 15b is the off-peak source and is the low metered rate. As shown, watt hour meters 16 and 17 are inserted in these sources of supply to measure the consumption of electrical energy from each source.

The lower heating element 14 is energized from the low rate metered source 15b through a suitable time switch 18 which operates to connect the heating unit 14 to the source 15b during the off-peak periods and to disconnect it from this source during the on-peak periods. The details of construction of the time switch 18 form no part of this invention. It will be understood that any suitable time switch that will perform the function of connecting and disconnecting the heating element 14 to and from the source 15b at predetermined intervals may be used.

A suitable switch device 19 is arranged to connect the upper heating element 13 either with the high rate metered source 15a or with the low rate metered source 15b depending upon the condition of the lower heating element 14. The switch 19 is operable between two positions: in the full line position shown in the drawing, it functions to connect the upper heating element 13 with the source 15a, whereas when it is moved away from this position to close its upper contacts 19b it disconnects the heating element 13 from the high rate metered source 15a and connects it to the low rate metered source 15b through the meter 17.

The switch 19 is operated between its upper and lower positions responsively to the time switch 18 and for this purpose the switch 19 is provided with an operating coil 20. This operating coil 20 is connected to the source of supply 15b through the time switch 18 on the tank side of the time switch, as shown in the drawing. When the time switch operates to energize the lower heating element 14 from the source 15b it at the same time energizes the operating coil 20 of the switch 19 which operation causes the switch to move to open contacts 19a and close the contact 19b. Thus, when the time switch connects the heating element 14 to the low rate metered source 15b, it also transfers the upper heating element 13 from the high rate metered source 15a to the low rate metered source 15b, and it maintains this connection until the time switch operates to disconnect the lower heating element 14 from the low rate source 15b. When this happens the energizing coil 20 is deenergized at the same time as the lower heating element 14 is deenergized and thereby permits the switch 19 to close the contacts 19a to reconnect the upper heating element 13 with the source 15a.

The heating elements are controlled by thermostats 21 and 22 respectively heated at the upper and lower portions of the tank, and connected in the energizing circuits of the heating element, as shown.

In the operation of the system, it will be understood that when the time switch operates at the beginning of the off-peak period to connect the heating element 14 to the supply source 15b, it will at the same time connect the heating element 13 at the top to this source 15b. During the off-peak period, the lower heating element 14 functions to heat up the stored water in the tank 10. If it heats substantially all of the water in tank 10, the thermostat 22 will deenergize it. If hot water is drawn off through pipe 12, the thermostat 22 will reenergize the heating element 14 to maintain a tank full of hot water. If, however, during this off-peak period the draw-offs from the hot water pipe 12 exceed the capacity of the heating element 14 so that the cold water line reaches the thermostat 21 at the top, this thermostat will function to connect the heating element 13 to the low rate metered source 15b to apply heat to the water in addition to that imparted by the element 14 so as to recoup quickly a supply of hot water. When the supply has been provided in the top of the tank, the upper thermostat 21 will disconnect the heating element 13 from the source 15b, but inasmuch as the water below the heating element 13 is still cold the thermostat 22 at the bottom will keep the heating element 14 energized until the entire contents of the tank have been heated, whereupon the thermostat 22 will disconnect the lower heating element 14.

At the beginning of the on-peak period, the time switch 18 will disconnect both heating elements 13 and 14 from the source 15b and will operate the switch 19 to connect the upper heating element 13 only to the high rate metered source 15a. If during the on-peak period, the contents of the hot water be depleted so that the cold water line reaches the upper levels, the upper thermostat 21 will control the heating element 13 to at least maintain a quantity of hot water in the upper portion of the tank.

It will be observed that at no time can either heating element 13 or 14 be connected with the high rate metered source during the off-peak period, and that during the on-peak period only the upper element 13 can be energized from the high rate source 15a.

In Fig. 2, there is illustrated a modified form of this invention wherein when the upper and lower heating elements are connected to the low rate metered source only when one element at a time may be energized so as to limit the total load on the system. As shown in Fig. 2, the storage tank 24 is provided with upper and lower heating elements 25 and 26 respectively. The upper heating element is connected by conductors 27 with a switch which is identically the same as the switch 19 of the first form, while the lower heating element 26 is connected by conductors 28 through a timing mechanism identically the same as the timing mechanism 18 with a low rate metered source.

As before, in the operation of the system when the time switch connects the lower heating element to the low rate metered source, it at the same time connects the upper heating element 25 to the low rate source.

However, there is interposed in the energizing circuits of the two heating elements 25 and 26 a thermostat 29 which is arranged to control the heating elements responsively to the temperature of the water in the upper portion of the tank so that only one element can be connected to the low rate metered source at a time. This thermostat has two sets of contacts 29a and 29b connected on the energizing circuits of the heating elements as shown. The lower heating element 26, as before, is provided with its own controlling thermostat 30, which has but one set of contacts 30a.

In the operation of the system, assuming that the time switch has connected the low rate metered source to both heating elements, the lower thermostat 30 will operate to control the lower heating element to maintain a supply of hot water in the tank, and if the contents of the upper portion of the tank have a predetermined high temperature, the thermostat 29 will have its contacts 29a closed so that the energizing circuit for the lower heating element is completed through the upper thermostat. If, however, the hot water draw-offs exceed the recuperating capacity of the lower heating element, the cold water line will reach the thermostat 29 and will cause it to operate to open its contacts 29a and close its contacts 29b. This operation disconnects the lower heating element 26 and completes an energizing circuit for the upper heating element 25 from the conductors 27. When the water in the upper portion of the tank has been heated to the predetermined high temperature, the upper thermostat will deenergize the upper element and will reenergize the lower element.

Any suitable temperature control devices may be used, but I prefer to use those of the type described and claimed in my United States Patent No. 1,977,393, dated October 16, 1934. Briefly, the upper thermostat comprises a bimetallic blade 31 which operates a switch arm mechanism 32 through a snap spring 33 all as described and claimed in the McCormick patent. As explained before the switch arm controls two sets of contacts 29a and 29b. The lower thermostat comprises a blade 34 which operates a switch mechanism 35 through a snap spring 36. In this case, however, the switch arm controls but the single set of control contacts 30a.

It is to be understood that the term "low rate metered source" is used in a generic sense and covers a system where a low rate meter is actually used, as indicated in the drawing, or a system where a low rate unmetered source is provided. In this latter case the watt hour meter 17 will not be used.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A liquid heater comprising a tank, a pair of heating elements for applying heat to different portions of said tank, high and low rate sources of supply for said heating elements, timing means for connecting and disconnecting one of said heating elements to and from said low rate source at predetermined intervals, and means operated responsively to the operation of said timing means to connect said one element to said low rate source for transferring the other heating element from said high rate to said low rate source, and for transferring it back to said high rate source when said timing means operates to disconnect said one heating element from said low rate source.

2. A water heating system comprising a water storage tank, a first electric heating element for applying heat to the upper portion of said tank, a second electric heating element for applying heat to the lower portion of said tank, on and off-peak supply sources for said first and second heating elements respectively, a time switch for connecting said second element to said off-peak source and for disconnecting it therefrom at predetermined intervals of time, and switching means operated responsively to the operation of said time switch for disconnecting said first heating element from said on-peak supply source and for connecting it with said off-peak source when said second heating element is connected with said off-peak source.

3. A water heating system comprising a water storage tank, a first electric heating element for applying heat to the upper portion of said tank, a second electric heating element for applying heat to the lower portion of said tank, high and low rate metered sources of supply for said first and second heating elements respectively, switching means arranged in one position to connect said first heating element with said high rate metered source, and in a second position to connect it with said low rate metered source, a time switch operating to connect said second heating element with said low rate metered source for predetermined intervals of time, and electroresponsive means controlled by said time switch for operating said switching means from said one position to the other position to transfer said first heating element from said high to said low rate metered source when said second heating element is connected with said low rate metered source.

4. A water heating system comprising a water storage tank, a first electric heating element for applying heat to the upper portion of said tank, a second electric heating element for applying heat to the lower portion of said tank, high and low rate metered sources of supply for said first and second heating elements respectively, switching means arranged in one position to connect said first heating element with said high rate metered source, and a second position to connect it with said low rate metered source, a time switch operating to connect said second heating element with said low rate metered source for predetermined intervals of time, electroresponsive means controlled by said time switch for operating said switching means from said one position to the other position to transfer said first heating element from said high to said low rate metered source when said second heating element is connected with said low rate metered source, and thermostatic devices responsive to the temperature of the water in said upper and lower portions respectively controlling the energization of said two heating elements respectively.

5. A water heating system having a water storage tank, electric heating elements for applying heat to the upper and lower portions of said tank, high and low rate sources of electrical supply, and time interval switching mechanism operable to connect both of said heating elements with said low rate source during off-peak periods, and to connect the upper heating element only with said high rate source during on-peak periods.

6. A water heating system comprising a water storage tank, a first electric heating element for applying heat to the upper portion of said tank, a second electric heating element for applying heat to the lower portion of said tank, on and off-peak supply sources for said first and second heating elements respectively, a time switch for connecting said second element to said off-peak source and for disconnecting it therefrom at predetermined intervals of time, switching means operated responsively to the operation of said time switch for disconnecting said first heating element from said on-peak supply source and for connecting it with said off-peak source when said second heating element is connected with said off-peak source, means responsive to the temperature of the water in the lower portion of said tank controlling said lower heating element, and means responsive to the temperature of the water in the upper portion of the tank controlling both of said heating elements so that when said temperature has a predetermined high value, said lower heating element only can be energized, and when below said predetermined value said upper heating element only can be energized.

FRANCIS H. McCORMICK.